US008676428B2

(12) United States Patent
Richardson et al.

(10) Patent No.: US 8,676,428 B2
(45) Date of Patent: Mar. 18, 2014

(54) SERVER REQUEST FOR DOWNLOADED INFORMATION FROM A VEHICLE-BASED MONITOR

(75) Inventors: Larry Richardson, San Diego, CA (US); Daniel Lambert, Carlsbad, CA (US)

(73) Assignee: Lytx, Inc., San Diego, CA (US)

( * ) Notice: Subject to any disclaimer, the term of this patent is extended or adjusted under 35 U.S.C. 154(b) by 39 days.

(21) Appl. No.: 13/448,725

(22) Filed: Apr. 17, 2012

(65) Prior Publication Data

US 2013/0274950 A1 Oct. 17, 2013

(51) Int. Cl.

| | |
|---|---|
| ***G01C 21/12*** | (2006.01) |
| ***G01C 21/14*** | (2006.01) |
| ***G01C 21/16*** | (2006.01) |

(52) U.S. Cl.

USPC ................ 701/25; 701/23; 701/24; 701/31.5; 701/300; 701/423; 701/424; 701/425; 701/484; 701/537

(58) Field of Classification Search

CPC ..... G01C 21/3415; G01C 13/931; G08G 1/16

USPC ............ 701/23–25, 31.5, 300, 537, 423–425, 701/484

See application file for complete search history.

(56) References Cited

U.S. PATENT DOCUMENTS

| | | | |
|---|---|---|---|
| 4,281,354 | A | 7/1981 | Conte |
| 4,718,685 | A | 1/1988 | Kawabe et al. |
| 5,140,436 | A | 8/1992 | Blessinger |
| 5,497,419 | A | 3/1996 | Hill |
| 5,546,191 | A | 8/1996 | Hibi et al. |
| 5,600,775 | A | 2/1997 | King et al. |
| 5,689,442 | A | 11/1997 | Swanson et al. |
| 5,815,093 | A | 9/1998 | Kikinis |
| 5,825,284 | A | 10/1998 | Dunwoody et al. |
| 6,141,611 | A | 10/2000 | Mackey et al. |

(Continued)

FOREIGN PATENT DOCUMENTS

| | | | |
|---|---|---|---|
| CA | 2692415 | A1 * | 8/2011 |
| DE | 4416991 | | 11/1995 |
| EP | 1818873 | | 8/2007 |
| GB | 2447184 | B | 1/2011 |

OTHER PUBLICATIONS

World News Tonight, Cbs Television New Program discussing teen drivers using the DriveCam Program and DriveCam Technology, Oct. 10, 2005, On PC formatted CD-R, World News Tonight.wmv, 7.02 Mb, Created Jan. 12, 2011.

(Continued)

*Primary Examiner* — Mary Cheung
*Assistant Examiner* — Atul Trivedi
(74) *Attorney, Agent, or Firm* — Van Pelt, Yi & James LLP

(57) ABSTRACT

A system for triggered request for downloaded information from a vehicle-based monitor comprises a transmitter, a receiver, and a processor. The processor is coupled to the transmitter and the receiver. The processor is configured to determine whether it is desired to receive one or more data from a vehicle-based monitor. In the event that it is desired to receive one or more data from the vehicle-based monitor, the processor is configured to provide an indication that it is desired to receive the one or more data from the vehicle-based monitor. The processor is configured to receive the one or more data.

25 Claims, 4 Drawing Sheets

(56) References Cited

U.S. PATENT DOCUMENTS

| | | | | |
|---|---|---|---|---|
| 6,163,338 | A | 12/2000 | Johnson et al. | |
| 6,298,290 | B1 * | 10/2001 | Abe et al. | 701/32.2 |
| 6,389,340 | B1 | 5/2002 | Rayner | |
| 6,405,132 | B1 | 6/2002 | Breed et al. | |
| 6,449,540 | B1 | 9/2002 | Rayner | |
| 6,575,902 | B1 | 6/2003 | Burton | |
| 6,718,239 | B2 | 4/2004 | Rayner | |
| 7,209,833 | B2 | 4/2007 | Isaji et al. | |
| 7,702,442 | B2 | 4/2010 | Takenaka | |
| 7,821,421 | B2 | 10/2010 | Tamir et al. | |
| 7,853,376 | B2 * | 12/2010 | Peng | 701/32.4 |
| 7,974,748 | B2 * | 7/2011 | Goerick et al. | 701/28 |
| 2001/0005804 | A1 | 6/2001 | Rayner | |
| 2002/0111725 | A1 | 8/2002 | Burge | |
| 2002/0163532 | A1 | 11/2002 | Thomas et al. | |
| 2003/0080878 | A1 | 5/2003 | Kirmuss | |
| 2004/0039503 | A1 | 2/2004 | Doyle | |
| 2004/0103010 | A1 | 5/2004 | Wahlbin et al. | |
| 2004/0236474 | A1 | 11/2004 | Chowdhary et al. | |
| 2005/0073585 | A1 | 4/2005 | Ettinger et al. | |
| 2005/0166258 | A1 | 7/2005 | Vasilevsky et al. | |
| 2006/0053038 | A1 | 3/2006 | Warren et al. | |
| 2006/0058950 | A1 * | 3/2006 | Kato et al. | 701/208 |
| 2006/0103127 | A1 | 5/2006 | Lie et al. | |
| 2006/0212195 | A1 | 9/2006 | Veith et al. | |
| 2006/0253307 | A1 | 11/2006 | Warren et al. | |
| 2007/0001831 | A1 | 1/2007 | Raz et al. | |
| 2007/0027726 | A1 | 2/2007 | Warren et al. | |
| 2007/0124332 | A1 | 5/2007 | Ballesty et al. | |
| 2007/0135979 | A1 | 6/2007 | Plante | |
| 2007/0136078 | A1 | 6/2007 | Plante | |
| 2007/0150140 | A1 | 6/2007 | Seymour | |
| 2007/0173994 | A1 | 7/2007 | Kubo et al. | |
| 2007/0208494 | A1 * | 9/2007 | Chapman et al. | 701/117 |
| 2007/0216521 | A1 | 9/2007 | Guensler et al. | |
| 2007/0241874 | A1 | 10/2007 | Okpysh et al. | |
| 2007/0257781 | A1 | 11/2007 | Denson | |
| 2007/0257804 | A1 | 11/2007 | Gunderson et al. | |
| 2007/0257815 | A1 | 11/2007 | Gunderson et al. | |
| 2007/0260677 | A1 | 11/2007 | DeMarco et al. | |
| 2007/0268158 | A1 | 11/2007 | Gunderson et al. | |
| 2007/0271105 | A1 | 11/2007 | Gunderson et al. | |
| 2007/0299612 | A1 | 12/2007 | Kimura et al. | |
| 2008/0167775 | A1 | 7/2008 | Kuttenberger et al. | |
| 2008/0269978 | A1 | 10/2008 | Shirole et al. | |
| 2009/0224869 | A1 | 9/2009 | Baker et al. | |
| 2010/0063672 | A1 | 3/2010 | Anderson | |
| 2010/0070175 | A1 | 3/2010 | Soulchin et al. | |
| 2010/0085193 | A1 | 4/2010 | Boss et al. | |
| 2010/0268415 | A1 * | 10/2010 | Ishikawa | 701/35 |
| 2011/0060496 | A1 * | 3/2011 | Nielsen et al. | 701/33 |
| 2011/0173015 | A1 * | 7/2011 | Chapman et al. | 705/1.1 |
| 2011/0224891 | A1 * | 9/2011 | Iwuchukwu | 701/117 |
| 2012/0035788 | A1 * | 2/2012 | Trepagnier et al. | 701/3 |

OTHER PUBLICATIONS

"World News Tonight", PBS Television New Program discussing teen drivers using the DriveCam Program and DriveCam Technology, Oct. 10, 2005, on PC formatted CD-R, Teens Behind the Wheel. wmv, 236 MB, Created Jan. 12, 2011.
"Driver Feedback System", Jun. 12, 2001.
Jean (DriveCam vendor), "Feedback Data Sheet", Nov. 6, 2002.
"Interior Camera Data Sheet", Oct. 26, 2001.
Jean (DriveCam vendor), "HindSight 20-20 Data Sheet", Nov. 4, 2002.
"DriveCam Driving Feedback System", Mar. 15, 2004.
Chris Woodyard, "Shuttles save with DriveCam", Dec. 9, 2003.
Julie Stevens, "DriveCam Services", Nov. 15, 2004.
Julie Stevens, "Program Support Roll-Out & Monitoring", Jul. 13, 2004.
Jessyca Wallace, "The DriveCam Driver Feedback System", Apr. 6, 2004.
Karen, "Managers Guide to the DriveCam Driving Feedback System", Jul. 30, 2002.
Del Lisk, "DriveCam Training Handout Ver4", Feb. 3, 2005.
Jessyca Wallace, "Overview of the DriveCam Program", Dec. 15, 2005.
"DriveCam—Illuminator Data Sheet", Oct. 2, 2004.
Karen, "Downloading Options to HindSight 20120", Aug. 6, 2002.
Bill, "DriveCam—FAQ", Dec. 12, 2003.
David Maher, "DriveCam Brochure Folder", Jun. 6, 2005.
"Passenger Transportation Mode Brochure", May 2, 2005.
Quinn Maughan, "DriveCam Unit Installation", Jul. 21, 2005.
Glenn Oster, "Illuminator Installation", Oct. 3, 2004.
Quinn Maughan, "HindSight Installation Guide", Sep. 29, 2005.
Quinn Maughan, "HindSight Users Guide", Jun. 20, 2005.
"Ambulance Companies Use Video Technology to Improve Driving Behavior", Ambulance Industry Journal, Spring 2003.
Lisa Mckenna, "A Fly on the Windshield?", Pest Control Technology Magazine, Apr. 2003.
Quinn Maughan, "Enterprise Services", Apr. 17, 2006.
Quinn Maughan, "DriveCam Enterprise Services", Jan. 5, 2006.
Quinn Maughan, "DriveCam Managed Services", Jan. 5, 2006.
Quinn Maughan, "DriveCam Standard Edition", Jan. 5, 2006.
Kathy Latus (Latus Design), "Case Study—Time Warner Cable", Sep. 23, 2005.
Kathy Latus (Latus Design), "Case Study—Cloud 9 Shuttle", Sep. 23, 2005.
Kathy Latus (Latus Design), "Case Study—Lloyd Pest Control", Jul. 19, 2005.
Bill Siuru, "DriveCam Could Save You Big Bucks", Land Line Magazine, May-Jun. 2000.
J. Gallagher, "Lancer Recommends Tech Tool", Insurance and Technology Magazine, Feb. 2002.
Jessyca Wallace, "Analyzing and Processing DriveCam Recorded Events", Oct. 6, 2003.
PCT/US2010/022012, Invitation to Pay Additional Fees with Communication of Partial International Search, Jul. 21, 2010.
U.S. Appl. No. 12/691,639, entitled "Driver Risk Assessment System and Method Employing Selectively Automatic Event Scoring", filed Jan. 21, 2010.
David Cullen, "Getting a real eyeful", Fleet Owner Magazine, Feb. 2002.
Ronnie Rittenberry, "Eyes on the Road", Jul. 2004.
"HindSight v4.0 Users Guide", DriveCam Video Systems, Apr. 25, 2005.
Glenn Oster, "HindSight 20/20 v4.0 Software Installation", 1 of 2, Jun. 20, 2003.
Glenn Oster, "HindSight 20/20 v4.0 Software Installation", 2 of 2, Jun. 20, 2003.
DriveCam Extrinsic Evidence with Patent LR 4.1.A Disclosures, Nov. 8, 2011.
"DriveCam, Inc's Disclosure of Proposed Constructions and Extrinsic Evidence Pursuant to Patent L.R. 4.1.A & 4.1.13" in *DriveCam, Inc.* v. *SmartDrive Systems, Inc.*, Case No. 3:11-CV-00997-H-RBB, for the Southern District of California. Nov. 8, 2011.
"Preliminary Claim Construction and Identification of Extrinsic Evidence of Defendant/Counterclaimant SmartDriveSystems, Inc." in *DriveCam, Inc.* v. *SmartDrive Systems, Inc.*, Case No. 3:11-CV-00997-H (RBB), for the Southern District of California. Nov. 8, 2011.
"DriveCam, Inc's Disclosure of Responsive Constructions and Extrinsic Evidence Pursuant to Patent L.R. 4.1.c & 4.1d" in *DriveCam, Inc.* v. *SmartDrive Systems, Inc.*, Case No. 3:11-CV-00997-H-RBB, for the Southern District of California. Nov. 15, 2011.
"Responsive Claim Construction and Identification of Extrinsic Evidence of Defendant/Counterclaimant SmartDrive Systems, Inc." in *DriveCam, Inc.* v. *SmartDrive Systems, Inc.*, Case No. 3:11-CV-00997-H (RBB), for the Southern District of California. Nov. 15, 2011.
"Joint Claim Construction Chart" in *DriveCam, Inc.* v. *SmartDrive Systems, Inc.*, Case No. 11-CV-0997-H (RBB), for the Southern District of California, Document 43, filed Dec. 1, 2011, pp. 1-2.

(56) References Cited

OTHER PUBLICATIONS

Joint Claim Construction Chart, U.S. Patent No. 6,389,340, "Vehicle Data Recorder" for Case No. 3:11-CV-00997-H-RBB, Document 43-1, filed Dec. 1, 2011, pp. 1-33.
"Joint Claim Construction Worksheet" in *DriveCam, Inc.* v. *SmartDrive Systems, Inc.*, Case No. 3:11-CV-00997 H (RBB), for the Southern District of California, Document 44, filed Dec. 1, 2011, pp. 1-2.
Joint Claim Construction Worksheet, U.S. Patent No. 6,389,340, "Vehicle Data Reporter" for Case No. 3:11-CV-00997-H-RBB, Document 44-1, filed Dec. 1, 2011, pp. 1-10.
"Answer to Amended Complaint; Counterclaims; and Demand for Jury Trial" in *DriveCam, Inc.* v. SmartDrive Systems, Inc., Case No. 3:11-CV-00997 H (RBB), for the Southern District of California, Document 47, filed Dec. 13, 2011, pp. 1-15.
"First Amended Answer to Amended Complaint and First Amended Counterclaims; and Demand for Jury Trial" in *DriveCam, Inc.* v. *SmartDrive Systems, Inc.*, Case No. 3:11-CV-00997 H (RBB), for the Southern District of California, Document 53, filed Dec. 20, 2011, pp. 1-48.
"First Amended Answer to Amended Complaint and First Amended Counterclaims; and Demand for Jury Trial" in *DriveCam, Inc.* v. *SmartDrive Systems, Inc.*, Case No. 3:11-CV-00997 H (RBB), for the Southern District of California, Document 55, filed Jan. 3, 2012, pp. 86-103.
DriveCam, User's Manual for DriveCam Video Systems', HindSight 20/20 Software Version 4.0, S002751-S002804(2003).
SmartDrives Systems, Inc.'s Production, S014246-S014255, Nov. 16, 2011.
"Supplement to DriveCam's Disclosure of Asserted Claims and Preliminary Infringement Contentions" in *DriveCam, Inc.* v. *SmartDrive Systems, Inc.*, Case No. 3:11-CV-00997-H-RBB, for the Southern District of California. Oct. 14, 2011.
"DriveCam's Disclosure of Asserted Claims and Preliminary Infringement Contentions" in *DriveCam, Inc.* v. *SmartDrive Systems, Inc.*, Case No. 3:11-CV-00997-H-RBB, for the Southern District of California. Aug. 19, 2011.
DriveCam, Inc.'s Infringement Contentions Exhibit A, U.S. Patent 6,389,340. Aug. 11, 2011.
DriveCam, Inc.'s Infringement Contentions Exhibit B, U.S. Patent 7,659,827. Aug. 19, 2011.
DriveCam, Inc.'s Infringement Contentions Exhibit C, U.S. Patent 7,804,426. Aug. 19, 2011.
U.S. Appl. No. 11/297,669, filed Dec. 8, 2005, File History.
"Amended Complaint for Patent Infringement, Trade Secret Misappropriation, Unfair Competition and Conversion" in *DriveCam, Inc.* v. *SmartDrive Systems, Inc.*, Case No. 3:11-CV-00997-H-RBB, for the Southern District of California, Document 34, filed Oct. 20, 2011, pp. 1-15.
U.S. Appl. No. 11/296,906, filed Dec. 8, 2005, File History.
U.S. Appl. No. 11/298,069, filed Dec. 9, 2005, File History.
U.S. Appl. No. 11/299,028, filed Dec. 9, 2005, File History.
U.S. Appl. No. 11/593,659, filed Nov. 7, 2006, File History.
U.S. Appl. No. 11/593,682, filed Nov. 7, 2006, File History.
U.S. Appl. No. 11/595,015, filed Nov. 9, 2006, File History.
U.S. Appl. No. 11/637,754, filed Dec. 13, 2006, File History.
U.S. Appl. No. 11/637,755, filed Dec. 13, 2006, File History.
Drivecam, Inc., User's Manual for Drivecam Video Systems' Hindsight 20/20 Software Version 4.0 (2003).
Gary and Sophia Rayner, Final Report for Innovations Deserving Exploratory Analysis (IDEA) Intelligent Transportation Systems (ITS) Programs' Project 84, I-Witness Black Box Recorder, San Diego, CA. Nov. 2001.
Panasonic Corporation, Video Cassette Recorder (VCR) Operating Instructions for Models No. PV-V4020/PV-V4520 (1998) (Exhibit 8) (hereinafter "Panasonic").
JVC Company of America, JVC Video Cassette Recorder HR-IP820U Instructions (1996).
Hans Fantel, Video; Search Methods Make a Difference in Picking VCR's, NY Times, Aug. 13, 1989.
Dan Carr, Flash Video template: Video Presentation with Navigation, Jan. 16, 2006.
I/O Port Racing Supplies' website discloses using Traqmate's Data Acquisition with Video Overlay system in conjunction with professional driver coaching sessions (available at http://www.ioportracing.com/Merchant2/merchant.mvc?Screen=CTGY&Category_Code=coaching)., printed from site on Jan. 11, 2012.
GE published its VCR User's Guide for Model VG4255 in 1995.
Adaptec published and sold its VideoOh! DVD software USB 2.0 Edition in at least Jan. 24, 2003.
Traqmate GPS Data Acquisition's Traqmate Data Acquisition with Video Overlay system was used to create a video of a driving event on Oct. 2, 2005 (available at http://www.trackvision.netiphpBB2/viewtopic.php?t=51&sid=1184fbbcbe3be5c87ffa0f2ee6e2da76), printed from site on Jan. 11, 2012.
David Vogeleer et al., Macromedia Flash Professional 8Unleashed (Sams Oct. 12, 2005) in Nov. 2005.
Jean (DriveCam vendor), "DriveCam brochure", Nov. 6, 2002.
"The DriveCam", Nov. 6, 2002.
Jean (DriveCam vendor), "DC Data Sheet", Nov. 6, 2002.

* cited by examiner

SERVER REQUEST FOR DOWNLOADED INFORMATION FROM A VEHICLE-BASED MONITOR

BACKGROUND OF THE INVENTION

A vehicle-based monitor is a valuable resource for vehicle fleet organization, vehicle incident investigation, and vehicle liability control. A vehicle-based monitor can provide real-time information regarding the location, speed, and direction of a vehicle to a centralized system, in order to assist with travel planning. It can capture audio and video at all times or in response to an incident, in order to determine the cause of the incident and who was at fault. Given the low costs of data storage and transmission and the high costs of personal and property liability, it is in the best interests of a commercial vehicle owner to collect and store as much data as possible.

It is now feasible to collect and store very large amounts of vehicle data very quickly, e.g., high definition audio and video, high resolution sensor data, etc. Despite the critical nature of a subset of this data, the vast majority of it is unneeded (e.g., everything is fine). Costs for data collection and storage have fallen rapidly, however, and costs for data transmission have not fallen at the same pace. It is not economical for the system to transmit the large bulk of unneeded data over the expensive data transmission channels.

BRIEF DESCRIPTION OF THE DRAWINGS

Various embodiments of the invention are disclosed in the following detailed description and the accompanying drawings.

DETAILED DESCRIPTION

Figure 1:
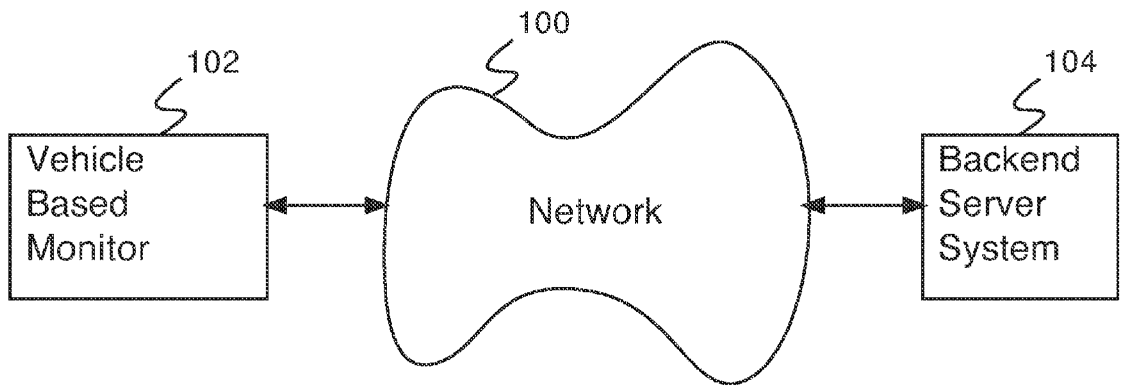
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for triggered request for downloaded information from a vehicle-based monitor is disclosed. The system comprises a transmitter, a receiver, and a processor. The processor is coupled to the transmitter and the receiver. The processor is configured to 1) determine whether it is desired to receive one or more data from a vehicle-based monitor; 2) in the event that it is desired to receive one or more data from the vehicle-based monitor; and 3) receive the one or more data.

In some embodiments, the system is further configured to receive a communication from a vehicle-based monitor. In various embodiments, the indication specifies that the data is not processed before transmission or that the data is processed before transmission, wherein the processing comprises compression (e.g., data compression, to a specified video bit rate, etc.), filtering (e.g., removing of inappropriate data), selection of a portion of data (e.g., shortened version, audio only, video only, etc.), or any other appropriate processing.

In some embodiments, the server triggered request for downloaded information from a vehicle-based monitor is disclosed. A vehicle-based monitor system comprises a vehicle, including a vehicle-based monitor, and a backend server system. The vehicle-based monitor collects data in various forms (e.g., video, audio, GPS position data, speedometer data, accelerometer data, etc.) and stores the data. The vehicle-based monitor communicates with the backend server system via a communications network (e.g., a cellular telephone network, a wired Internet connection, a wireless Internet connection, etc.). The backend server system transmits a data request indication to the vehicle-based monitor. In response to the data request indication, data is transmitted to the backend server system. In some embodiments, the data request indication specifies that the data is to be processed before transmission.

In some embodiments, the vehicle-based monitor transmits a communication to the backend server system at regular intervals (e.g., once a day, once an hour, once a minute, etc.). In some embodiments, the vehicle-based monitor transmits a communication when an incident occurs (e.g., the sensors determine there may have been a crash, the vehicle remains idle for too long, etc.). The communication contains recorded data or processed recorded data (e.g., a subset of the recorded data, a reduced quality version of the recorded data, data derived from the recorded data, etc.). The backend server system processes the data received in the communication and determines whether it is desired to receive one or more data from the vehicle-based monitor. For example, the backend server system indicates a desire to see more detailed data regarding a data received from the vehicle-based monitor, the backend server system indicates a desire to see data with regard to a time of interest, a location of interest, a suspected event of interest based on received data from the vehicle monitor or based on other received information, or any other appropriate criterion for indicating a desire to see more detailed data. In the event that it is desired to receive one or more data from the vehicle-based monitor, the backend server system provides, sends, or causes to be sent an indication to the vehicle-based monitor requesting the required data. In some embodiments, the determination of whether to request more data is based on processing of data received where the processing of the data received comprises automated data processing, examination of the data by a human, a combination of automated processing and examination by a human, or any other appropriate data processing. Processing of the data received in the communication can happen immediately or be delayed until a later time (e.g., when the server is less busy, when an appropriate human is available, etc.). The indication for data can specify that the data is to be transmitted immediately or is to be transmitted at a later appropriate time (e.g., when data transmission costs are lower, the next time the vehicle-based monitor enters a wireless access point, etc.).

FIG. 1 is a block diagram illustrating an embodiment of a network system. In some embodiments, the network system of FIG. 1 comprises a network system for a server triggered request for downloaded information from a vehicle-based monitor. In the example shown, the network system of FIG. 1 comprises network 100, vehicle-based monitor 102, and backend server system 104. In various embodiments, network 100 comprises a cellular network, a satellite network, a wireless connection to an Ethernet network, a wireless connection to the Internet, a wired network connection, a wired connection to the Internet, a local area network, or any other appropriate network. Vehicle-based monitor 102 and backend server system 104 communicate via network 100. In various embodiments, vehicle-based monitor 102 and backend server system 104 communicate continuously, at predefined times, at randomly-determined times, at event-determined times, at data-driven times, whenever prompted by a human, or at any other appropriate times. In some embodiments, vehicle-based monitor 102 and backend server system 104 communicate to perform a server triggered request for downloaded information from a vehicle-based monitor.

Figure 2:
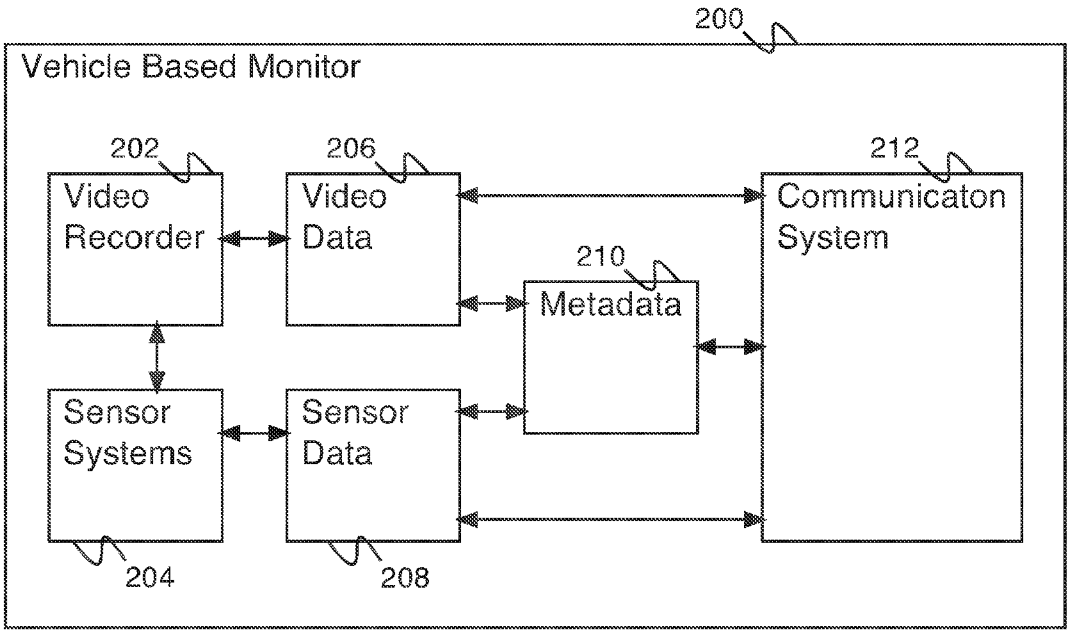
FIG. 2 is a block diagram illustrating an embodiment of a vehicle-based monitor.

FIG. 2 is a block diagram illustrating an embodiment of a vehicle-based monitor. In some embodiments, vehicle-based monitor 200 comprises vehicle-based monitor 102 of FIG. 1. In the example shown, vehicle-based monitor 200 comprises video recorder 202. In various embodiments, video recorder 202 comprises a high-definition video recorder, a standard-definition video recorder, a low-resolution video recorder, a color video recorder, a black-and-white video recorder, an infrared video recorder, or any other appropriate video recorder. In some embodiments, video recorder 202 comprises more than one video recorder. In various embodiments, each of the one or more video recorders comprising video recorder 202 records video of the road ahead of the vehicle, of the road behind the vehicle, of the road on either side of the vehicle, of the head of the vehicle driver, of the feet of the vehicle driver, or of any other appropriate location. Data recorded by video recorder 202 is stored as video data 206. In some embodiments, video data 206 comprises video recorded by video recorder 202 as well as processed versions of data recorded by video recorder 202. In various embodiments, processed versions of data recorded by video recorder 202 comprise reduced resolution video versions, compressed video versions, cropped video versions, frame rate reduction, still frame image capture, filtered video versions, or any other appropriate video versions. In some embodiments, both original video versions and processed video versions are stored. In some embodiments, original video versions are discarded in order to save space.

Vehicle-based monitor 200 additionally comprises sensor systems 204. In various embodiments, sensor systems 204 comprise one or more of an audio recorder, an accelerometer, a speedometer, a GPS positioning sensor, video feeds (e.g., in support of vision algorithms), ADAS (advanced driver assistance systems), a Driver ID system, a vision algorithm for incident capture (e.g., lane departure warning) and supporting meta data (e.g., driver ID), or any other appropriate sensor system. In some embodiment, sensor systems 204 communicate with video recorder 202 for purposes of synchronization (e.g., synchronizing audio with video). Data recorded by sensor systems 204 is stored as sensor data 208. In some embodiments, sensor data 208 comprises data recorded by sensor systems 204 as well as processed versions of data recorded by sensor systems 204. In various embodiments, processed versions of data recorded by sensor systems 204 comprise reduced resolution data versions, compressed data versions, filtered data versions, or any other appropriate data versions. In some embodiments, both original data versions and processed data versions are stored. In some embodiments, original data versions are discarded in order to save space. In some embodiments, data is processed in response to a request to transmit data.

Metadata 210 comprises data describing video data 206 and sensor data 208. In various embodiments, metadata comprises file size data, file length data, file creation time data, file modification time data, or any other appropriate file descriptor data. In some embodiments, metadata 210 additionally comprises derived data. In various embodiments, derived data comprises average audio frequency data, average accelerometer frequency data, accelerometer impulse data, average speed data, maximum speed data, daily miles traveled data, daily number of stops data, or any other appropriate derived data. For example, statistical measures of data, maxima and/or minima, averages, means, standard deviations, or any other appropriate derived data.

Vehicle-based monitor 200 additionally comprises communication system 212. Communication system 212 comprises a system for communicating with a backend server system (e.g., backend server system 104 of FIG. 1) via a network (e.g., network 100 of FIG. 1). In various embodiments, communication system 212 comprises a cellular communication system, a satellite communication system, a wireless Ethernet communication system, a wired Ethernet communication system, a local area network communication system, or any other appropriate communication system. Vehicle-based monitor 200 transmits data (e.g., video data 206, sensor data 208, metadata 210) via communication system 212. In some embodiments, vehicle-based monitor 200 transmits communications via communication system 212. In various embodiments, communications comprise regularly occurring communications (e.g., once a minute, once an hour, once a day) or incident triggered communications (e.g., sent when data recorded by the vehicle-based monitor indicates an incident). In some embodiments, the communications comprise data. In various embodiments, the communications comprise recorded data, processed recorded data, metadata, a subset of recorded data, a reduced quality version of recorded data, data derived from recorded data, vehicle status data, or any other appropriate data. Vehicle-based monitor 200 additionally receives data (e.g., configuration data, route plan data, maximum allowable speed data, etc.) and indications to transmit data via communication system 212. In various embodiments, indications to transmit data via communication system 212 comprise indications to transmit video data, audio data, global positioning system data, accelerometer data, speedometer data, gyroscopic data, vehicle bus sensor data, hard braking data, automatic brake sensing (ABS) data (e.g., engagement data), vision algorithm data, metadata, derived data, or any other appropriate data. In some embodiments, communications for a server triggered request for downloaded information from a vehicle-based monitor are carried via communication system 212.

Figure 3:
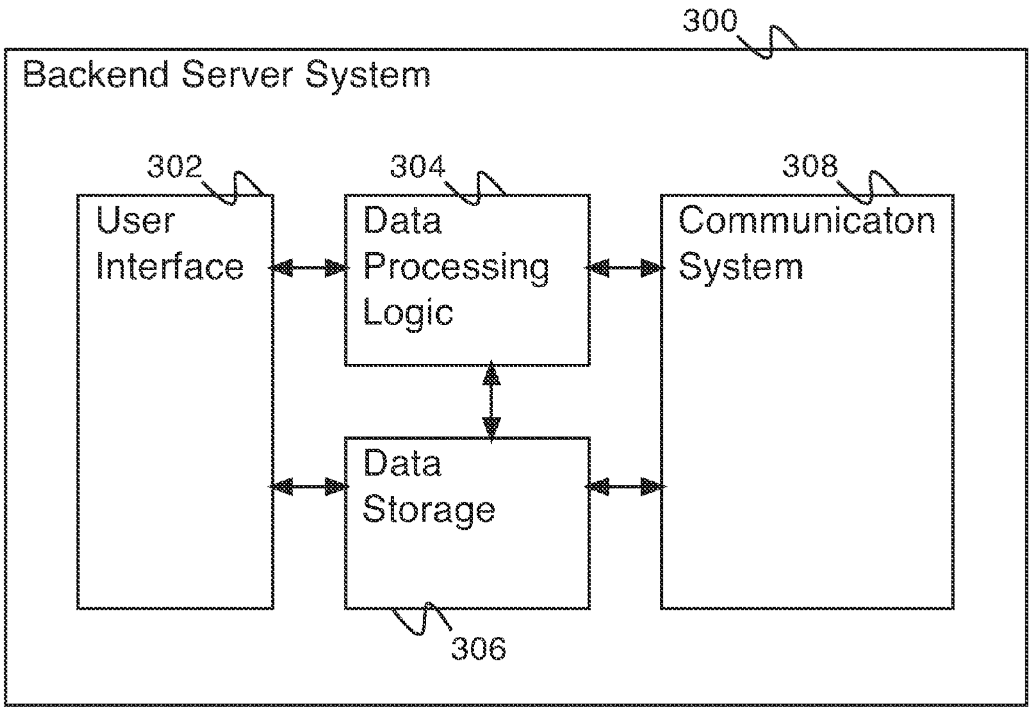
FIG. 3 is a block diagram illustrating an embodiment of a backend server system.

FIG. 3 is a block diagram illustrating an embodiment of a backend server system. In some embodiments, backend server system 300 comprises backend server system 104 of FIG. 1. In the example shown, backend server system 300 comprises user interface 302. User interface 302 comprises a user interface for allowing a user to interact with backend server system 300. In various embodiments, user interface 302 allows a user to view downloaded data (e.g., data recorded by vehicle-based monitor 102 of FIG. 1 and downloaded to the backend server system), process downloaded data (e.g., zooming, filtering, etc.), change communications settings (e.g., how often the backend server system and the vehicle-based monitor communicate, what data is automatically downloaded when the backend server system and the vehicle-based monitor communicate, under what circumstances the server system should request more data be downloaded, data communications protocols, etc.), request more data be downloaded from the vehicle-based monitor (e.g., immediately or at a later time), or perform any other appropriate user interface task. In some embodiments, a video segment transmitted from the vehicle-based monitor to backend server system 300 by default comprises video starting 10 seconds before an incident and lasting until 20 seconds after the incident (e.g., potential accident or event of interest).

In some embodiments, the default start and end points of a video segment transmitted from the vehicle-based monitor to backend server system 300 are modifiable via user interface 302. In some embodiments, the default resolution of a video segment transmitted from the vehicle-based monitor to backend server system 300 is modifiable via user interface 302. In some embodiments, when a user begins interacting with user interface 302, he enters a user name, user ID, or other identifying information. In some embodiments, requests to receive one or more data from the vehicle-based monitor are checked against the identifying information of the user to determine whether the user has permission to make the request. In some embodiments, backend server system 300 stores contact information associated with the user (e.g., email address, phone number) and can automatically notify the user when a request is completed. In some embodiments, when a user makes a request via user interface 302 to receive one or more data from the vehicle-based monitor, he is required to indicate a reason for the request (e.g., by typing the reason into a reason field, by selecting the reason from a menu, etc.). In some embodiments, when a user makes a request via user interface 302 to receive one or more data from the vehicle-based monitor, he is requested to indicate the length, quality, and resolution of any video to be downloaded. In some embodiments, user interface 302 displays the status of each previously made request to receive one or more data from the vehicle-based monitor. In various embodiments, possible statuses for previously made requests include request in process, request complete, request canceled, or any other appropriate request. In some embodiments, user interface 302 displays identifying information associated with each previously made request. In some embodiments, user interface 302 displays reason information associated with each previously made request. In some embodiments, a user can request a history report via user interface 302, listing previously made requests along with associated user and reason information, over configurable blocks of time.

Backend server system additionally comprises data processing logic 304. Data processing logic 304 comprises data processing logic for processing data and making decisions. In some embodiments, data processing logic 304 comprises logic for automatically processing data downloaded from the vehicle-based monitor and determining whether it is desired to receive one or more data from the vehicle-based monitor. In some embodiments, determining whether it is desired to receive one or more data from the vehicle-based monitor comprises automatically processing received data. In some embodiments, determining whether it is desired to receive one or more data from the vehicle-based monitor comprises examination of received data by a human. A human might decide it is desired to receive additional data after examining received data in order to gain a higher resolution view (e.g., in order to resolve the license plate of a vehicle with which there was an incident or the face of the driver of a vehicle with which there was an incident), in order to retrieve the view of an additional camera (e.g., to see in the direction that an incident occurred or what was going on in a different direction when an incident occurred, or in order to gain a view of the driver of the vehicle with the vehicle monitor to establish whether he was distracted or driving with full concentration at the time of an incident), in order to retrieve a longer view (e.g., in order to gain more information regarding the consequences of an incident), in order to retrieve data regarding an incident that was known to have occurred but not automatically indicated as such (e.g., a minor incident), or for any other appropriate reason.

In various embodiments, data processing logic 304 determines that it is desired to receive one or more data from the vehicle-based monitor to be downloaded immediately, that it is desired to receive one or more data from the vehicle-based monitor to be downloaded at a later time, that some of the one or more data from the vehicle-based monitor is required to be downloaded immediately and some of the or more data from the vehicle-based monitor is required to be downloaded at a later time, that a human needs to be contacted to determine whether the one or more data from the vehicle-based monitor is required to be downloaded, or any other appropriate decision. In some embodiments, the decision-making process involves determining the likelihood that a noteworthy event has occurred. In some embodiments, parameters of the decision-making process are set by a user via user interface 302. In some embodiments, the decision-making process involves a cost function. In some embodiments, records of driver history are kept by the backend server system and the decision-making process is based at least in part on the driver (e.g., the driver identity, driver history, etc.). In some embodiments, a driver score is kept by the backend server system and the decision-making process is based at least in part on the driver score. For example, it is determined whether it is desired to receive one or more data from the vehicle-based monitor is based at least in part on the driver score (e.g., if the driver score is high then the threshold for requesting data is higher, or if the driver score is low then the threshold for requesting data is lower, etc.). In some embodiments, communicating a decision that more data is required comprises a server triggered request for downloaded information.

Backend server system 300 additionally comprises data storage 306 and communication system 308. Data storage 306 comprises data storage for storing data downloaded from the vehicle-based monitor. Communication system 308 comprises a system for communicating with the vehicle-based data via a network (e.g., network 100 of FIG. 1). In various embodiments, communication system 308 comprises a cellular communication system, a satellite communication system, a wireless Ethernet communication system, a wired Ethernet communication system, a local area network communication system, or any other appropriate communication system. Backend server system 300 receives data (e.g., video data, sensor data, metadata, etc.) via communication system 308. Backend server system 300 additionally transmits data (e.g., configuration data, route plan data, maximum allowable speed data, etc.) and requests for more data via communication system 308. In some embodiments, communications for a server triggered request for downloaded information from a vehicle-based monitor are carried via communication system 308.

Figure 4:
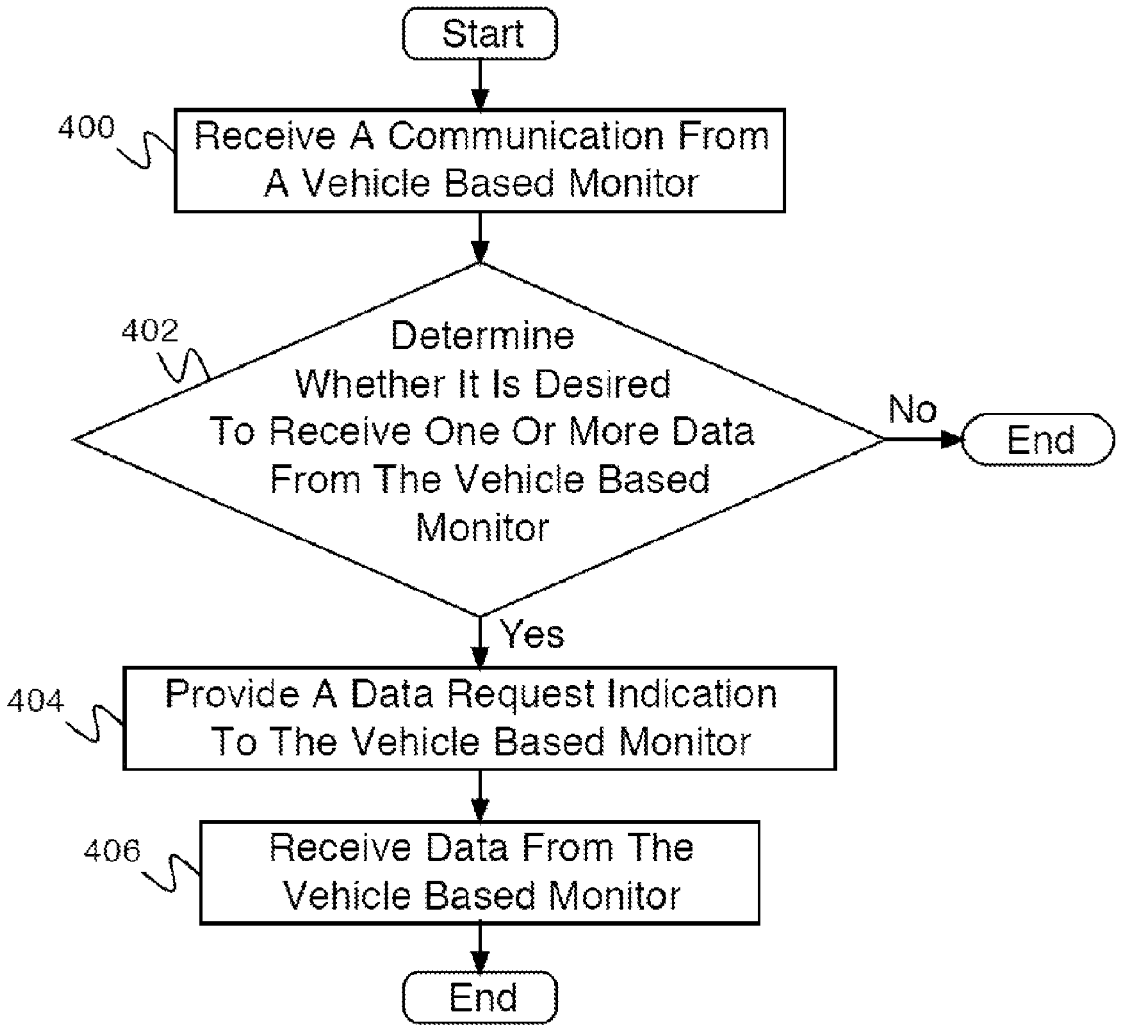
FIG. 4 is a flow diagram illustrating an embodiment of a process for a server triggered request for downloaded information.

FIG. 4 is a flow diagram illustrating an embodiment of a process for a server triggered request for downloaded information. In some embodiments, the process of FIG. 4 is carried out by a backend server system (e.g., backend server system 104 of FIG. 1). In the example shown, a communication is received from a vehicle-based monitor (e.g., vehicle-based monitor 102 of FIG. 1). In some embodiments, the communication comprises data. In various embodiments, the communication comprises recorded data, processed recorded data, metadata, a subset of recorded data, a reduced quality version of recorded data, data derived from recorded data, vehicle status data, or any other appropriate data. In some embodiments, the communication is regularly occurring (e.g., once a minute, once an hour, once a day, etc.). In some embodiments, the communication is incident triggered (e.g., sent when data recorded by the vehicle-based monitor indicates an incident). In some embodiments, the communication is backend server system triggered (e.g., SMS or Push Notification). In some embodiments, the process comprises initiate (e.g., trigger) a communication with a vehicle based monitor. For example, the backend server calls/signals the vehicle based monitor to initiate the communication.

In 402, it is determined whether it is desired to receive one or more data from the vehicle-based monitor. In some embodiments, determining whether it is desired to receive one or more data from the vehicle-based monitor is based at least in part on the communication. In some embodiments, determining whether it is desired to receive one or more data from the vehicle-based monitor comprises processing the communication. In various embodiments, determining whether it is desired to receive one or more data from the vehicle-based monitor is based at least in part on video data, on audio data, on accelerometer data, on speedometer data, on global positioning system data, on metadata, or on any other appropriate data. In some embodiments, records of driver history are kept by the backend server system and determining whether it is desired to receive one or more data from the vehicle-based monitor is based at least in part on the driver (e.g., a driver score, a driver history, etc.). In some embodiments, a driver score is kept by the backend server system and determining whether it is desired to receive one or more data from the vehicle-based monitor is based at least in part on the driver score. In some embodiments, the communication is processed by data processing logic (e.g., data processing logic 304 of FIG. 3) and the data processing logic determines whether it is desired to receive one or more data from the vehicle-based monitor. In some embodiments, determining whether it is desired to receive one or more data from the vehicle-based monitor comprises examination of the communication by a human. In some embodiments, a human views the communication or data contained within the communication via a user interface (e.g., user interface 302 of FIG. 3) and determines whether it is desired to receive one or more data from the vehicle-based monitor. In some embodiments, determining whether it is desired to receive one or more data from the vehicle-based monitor occurs immediately after the communication is received. In some embodiments, determining whether it is desired to receive one or more data from the vehicle-based monitor occurs at a later time.

In the event that it is determined in 402 that more data is not required, then the process ends. In the event that it is determined in 402 that more data is required, control passes to 404. In 404, a data request indication is provided (e.g., transmitted, caused to be transmitted, etc.) to the vehicle-based monitor. In various embodiments, the data request indication comprises a request to transmit video data, audio data, global positioning system data, accelerometer data, speedometer data, metadata, derived data, or any other appropriate data. In some embodiments, the data request indication specifies the data be transmitted immediately. In some embodiments, the data request indication specifies the data be transmitted at a later time. In some embodiments, the data request indication specifies that the data be processed before transmission (e.g., the data be compressed, the data be reduced resolution, the data be filtered, only a portion of the recorded data be transmitted, etc.). In 406, data is received from the vehicle-based monitor.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for triggered request for downloaded information from a vehicle-based monitor comprising:

a transmitter to transmit, via a first network, one or more indications to a vehicle-based monitor;

a receiver to receive, via the first network or a second network, data transmitted from the vehicle-based monitor that includes one or more communications;

a processor coupled to the transmitter and the receiver and configured to:

determine, based at least in part on a communication received by the receiver from the vehicle-based monitor, whether it is desired to receive one or more additional data from the vehicle-based monitor, wherein the one or more additional data is at least one of: different from the received communication or not included in the received communication; and in the event that it is determined that it is desired to receive one or more additional data from the vehicle-based monitor:

cause the transmitter to provide an indication to the vehicle-based monitor that it is desired to receive the one or more additional data from the vehicle-based monitor; and receive the one or more additional data from the vehicle-based monitor.

2. The system of claim 1, wherein the communication is regularly occurring.

3. The system of claim 1, wherein the communication is incident triggered.

4. The system of claim 1, wherein the communication comprises recorded data.

5. The system of claim 1, wherein the communication comprises processed recorded data.

6. The system of claim 1, wherein the communication comprises a subset of recorded data.

7. The system of claim 1, wherein the communication comprises a reduced quality version of recorded data.

8. The system of claim 1, wherein the communication comprises data derived from recorded data.

9. The system of claim 1, wherein determining whether it is desired to receive one or more data from the vehicle-based monitor is based at least in part on the communication.

10. The system of claim 9, wherein determining whether it is desired to receive one or more data from the vehicle-based monitor comprises processing the communication.

11. The system of claim 9, wherein determining whether it is desired to receive one or more data from the vehicle-based monitor comprises examination of the communication by a human.

12. The system of claim 1, wherein determining whether it is desired to receive one or more data from the vehicle-based monitor is based at least in part on a driver of a vehicle associated with the vehicle-based monitor.

13. The system of claim 1, wherein the indication specifies the data be transmitted immediately.

14. The system of claim 1, wherein the indication specifies the data be transmitted at a later time.

15. The system of claim 1, wherein the indication specifies that the data be processed before transmission.

16. The system of claim 15, wherein processing comprises compression.

17. The system of claim 15, wherein processing comprises filtering.

18. The system of claim 15, wherein processing comprises selection of a portion of the data for transmission.

19. The system of claim 1, wherein the indication specifies that the data is not processed before transmission.

20. The system of claim 1, wherein data comprises one or more of the following: video data, audio data, global positioning system data, accelerometer data, speedometer data, gyroscopic data, vehicle bus sensor data, hard braking data, automatic brake sensing data, or derived data.

21. The system of claim 1, wherein data is received via the wireless connection.

22. The system of claim 1, wherein data is received via the wired network connection.

23. A method for triggered request for downloaded information from a vehicle-based monitor comprising:

receiving, via a first network, a communication from a vehicle-based monitor;

determining, using a processor and based at least in part on the communication received from the vehicle-based monitor, whether it is desired to receive one or more additional data from the vehicle-based monitor, wherein the one or more additional data is at least one of: different from the received communication or not included in the received communication;

in the event that it is determined that it is desired to receive one or more additional data from the vehicle-based monitor:

providing, via the first network or a second network, an indication to the vehicle-based monitor that it is desired to receive the one or more data from the vehicle-based monitor; and receiving the one or more additional data from the vehicle-based monitor.

24. A computer program product for downloaded information from a vehicle-based monitor, the computer program product being embodied in a tangible and non-transitory computer readable storage medium and comprising computer instructions for:

receiving, via a first network, a communication from a vehicle-based monitor;

determining, using a processor and based at least in part on the communication received from the vehicle-based monitor, whether it is desired to receive one or more additional data from the vehicle-based monitor, wherein the one or more additional data is at least one of: different from the received communication or not included in the received communication;

in the event that it is determined that it is desired to receive one or more additional data from the vehicle-based monitor:

providing, via the first network or a second network, an indication to the vehicle-based monitor that it is desired to receive the one or more data from the vehicle-based monitor; and receiving the one or more additional data from the vehicle-based monitor.

25. The system of claim 1, wherein the one or more additional data related to the received communication includes data having a different resolution than the received communication, data having a view of an additional camera view in addition to the view of the camera of the received communication, or data having a different view than the received communication.

* * * * *